(12) United States Patent
Yokomizo

(10) Patent No.: US 10,848,685 B2
(45) Date of Patent: Nov. 24, 2020

(54) IMAGING SYSTEM, IMAGE PROCESSING APPARATUS, IMAGING SYSTEM CONTROL METHOD, IMAGE PROCESSING APPARATUS CONTROL METHOD, AND PROGRAM

(71) Applicant: CANON KABUSHIKI KAISHA, Tokyo (JP)

(72) Inventor: Tsuyoshi Yokomizo, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/487,782

(22) Filed: Apr. 14, 2017

(65) Prior Publication Data

US 2017/0302860 A1    Oct. 19, 2017

(30) Foreign Application Priority Data

Apr. 15, 2016   (JP) .................................. 2016-082146

(51) Int. Cl.
*H04N 5/247*     (2006.01)
*H04N 5/232*     (2006.01)
(Continued)

(52) U.S. Cl.
CPC ............ *H04N 5/247* (2013.01); *G06T 7/74* (2017.01); *G08B 13/19643* (2013.01); *H04N 5/232* (2013.01); *H04N 5/23206* (2013.01); *H04N 5/23238* (2013.01); *H04N 5/23296* (2013.01); *H04N 7/181* (2013.01)

(58) Field of Classification Search
None
See application file for complete search history.

(56) References Cited

U.S. PATENT DOCUMENTS

| 6,215,519 B1 | 4/2001 | Nayar et al. | |
| 2008/0259158 A1* | 10/2008 | Flint | H04N 5/232 348/143 |

(Continued)

FOREIGN PATENT DOCUMENTS

| CN | 102342099 A | 2/2012 |
| CN | 104394356 A | 3/2015 |

(Continued)

OTHER PUBLICATIONS

European Search Report dated Sep. 11, 2017 in corresponding European Patent Application No. 17161748.3, 7 pages.

(Continued)

*Primary Examiner* — James M Anderson, II
(74) *Attorney, Agent, or Firm* — Carter, DeLuca & Farrell LLP

(57) ABSTRACT

The present invention provides an imaging system which allows an imaging direction to be changed to a position intended by the user. An imaging system according to the present invention includes an image acquiring unit adapted to acquire an image captured by the first imaging apparatus; a position determining unit adapted to determine one of a plurality of pieces of position information in an object space of the image as an imaging position in priority order; and a controlling unit adapted to change a viewing point of a second imaging apparatus based on the imaging position.

9 Claims, 9 Drawing Sheets

(51) Int. Cl.
   *G08B 13/196* (2006.01)
   *G06T 7/73* (2017.01)
   *H04N 7/18* (2006.01)

(56) References Cited

U.S. PATENT DOCUMENTS

| | | | |
|---|---|---|---|
| 2011/0310219 A1* | 12/2011 | Kim | G08B 13/19643 348/36 |
| 2014/0355015 A1 | 12/2014 | Yokomizo | |
| 2015/0244991 A1 | 8/2015 | Noda et al. | |
| 2016/0037052 A1 | 2/2016 | Brunner et al. | |
| 2016/0227128 A1* | 8/2016 | Um | H04N 5/2258 |
| 2016/0239974 A1* | 8/2016 | Wang | G01C 3/32 |

FOREIGN PATENT DOCUMENTS

| | | |
|---|---|---|
| CN | 104506819 A | 4/2015 |
| CN | 104639916 A | 5/2015 |
| CN | 104954668 A | 9/2015 |
| JP | 2000-32319 A | 1/2000 |
| JP | 2000-341574 A | 12/2000 |
| JP | 2004-320175 A | 11/2004 |
| JP | 2010-28415 A | 2/2010 |
| KR | 10-2010-0129125 A | 12/2010 |
| WO | 2015072117 A1 | 5/2015 |

OTHER PUBLICATIONS

Notification of Reason for Refusal issued by the Korean Intellectual Property Office dated Dec. 2, 2019 in corresponding Korean Patent Application No. 10-2017-0045800, with English translation.

Notification of First Office Action issued by the China National Intellectual Property Administration dated Aug. 30, 2019 in corresponding Chinese Patent Application No. 201710245106.1 with English translation.

Notice of Reasons for Refusal issued by the Japanese Patent Office dated Feb. 4, 2020 in corresponding Japanese Patent Application No. 2016-082146, with English translation.

Office Action issued by the European Patent Office dated Jun. 25, 2020 in corresponding European Patent Application No. 17161748.3.

* cited by examiner

IMAGING SYSTEM, IMAGE PROCESSING APPARATUS, IMAGING SYSTEM CONTROL METHOD, IMAGE PROCESSING APPARATUS CONTROL METHOD, AND PROGRAM

BACKGROUND OF THE INVENTION

Field of the Invention

The present invention relates to an imaging system which uses a wide-angle lens camera and a zoom-lens camera as well as to an image processing apparatus, an imaging system control method, an image processing apparatus control method, and a program.

Description of the Related Art

As shown in Japanese Patent Application Laid-Open No. 2000-32319 and Japanese Patent Application Laid-Open No. 2000-341574, a camera control system is known which uses a wide-angle lens camera and a zoom-lens camera, where the zoom-lens camera has pan, tilt and zoom functions. With the camera control system, by controlling panning, tilting and zooming the zoom-lens camera sets an imaging direction of the zoom-lens camera to a position specified on an all-round image captured by the wide-angle lens camera.

Japanese Patent Application Laid-Open No. 2004-320175 proposes a camera system adapted to measure a distance to an object located at a specified position. With the camera system according to Japanese Patent Application Laid-Open No. 2004-320175, once any position on an image captured by a wide-angle lens camera is specified, the distance to an object is measured using infrared radiation. Then, depth is determined at any desired point in the image, and the imaging direction of the zoom-lens camera around the wide-angle lens camera is set to the specified position. A surveillance camera system equipped with plural cameras having a zoom function is proposed in Japanese Patent Application Laid-Open No. 2010-28415. A main camera measures a distance from a reference point of the main camera to a viewing point using an autofocus function, and calculates a coordinate location of the viewing point, and then a sub-camera located around the main camera sets the imaging direction at the coordinate location of the viewing point.

SUMMARY OF THE INVENTION

Since the wide-angle lens camera and zoom-lens camera are set up at different positions, in order to set the imaging direction of the zoom-lens camera to a predetermined position on the image captured by the wide-angle lens camera, information on depth at the predetermined position, i.e., information on position in space is needed. However, with the techniques described in Japanese Patent Application Laid-Open No. 2000-32319 and Japanese Patent Application Laid-Open No. 2000-341574, the distance to the object located at the position specified on the all-round image captured by the wide-angle lens camera is unknown and the position in space is not known, and thus it is difficult to set the imaging direction of the zoom-lens camera to a position intended by a user. Also, with the techniques described in Japanese Patent Application Laid-Open No. 2004-320175 and Japanese Patent Application Laid-Open No. 2010-28415, if distance information is unavailable, it is difficult to set the imaging direction of the zoom-lens camera to a specified position. In this way, it is sometimes difficult to change the imaging direction of the zoom-lens camera to a position intended by the user.

An object of the present invention is to provide an imaging system which allows an imaging direction to be changed to a position intended by the user.

According to an aspect of the present invention, an imaging system comprises: an image acquiring unit adapted to acquire an image captured by a first imaging apparatus; a position determining unit adapted to determine one of a plurality of pieces of position information in an object space of the image as an imaging position in priority order; and a controlling unit adapted to change a viewing point of a second imaging apparatus based on the imaging position.

With the present invention, one of plural pieces of position information in the object space of an image is established as an imaging position in priority order. Consequently, since the viewing point of the second imaging apparatus can be changed to an imaging position determined in the priority order of the plural pieces of position information, the imaging direction can be changed to a position intended by the user.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

First Embodiment

Figure 1A:
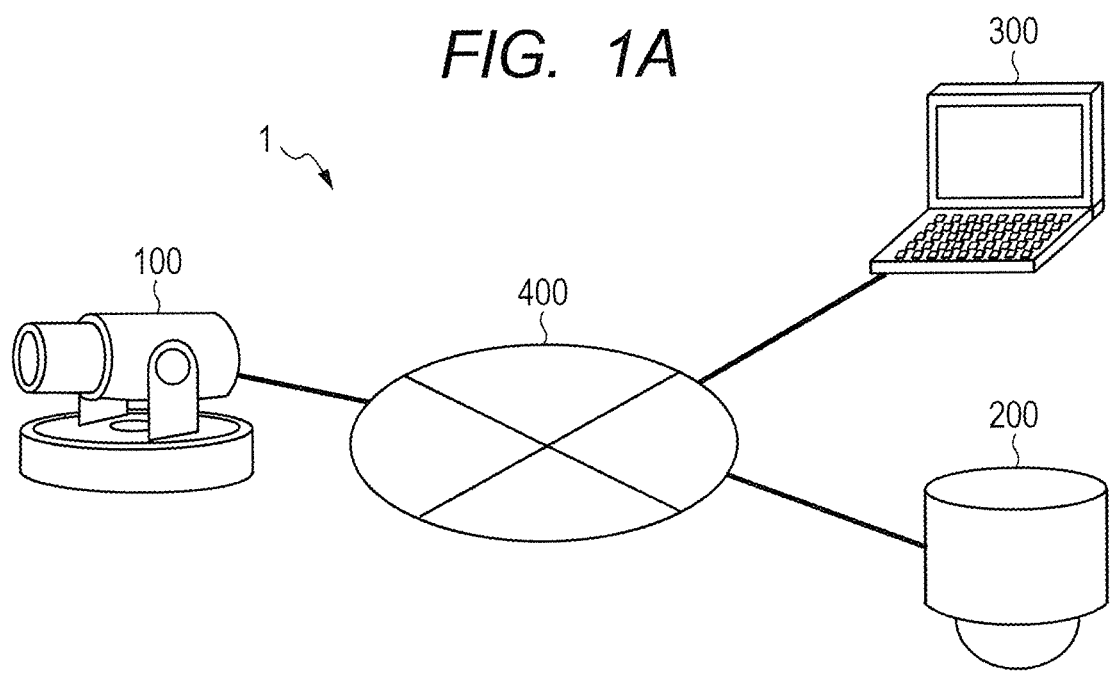
FIGS. 1A and 1B are system configuration diagrams of an imaging system according to a first embodiment of the present invention.

An imaging system according to the present embodiment will be described with reference to FIGS. 1A and 1B. FIG. 1A is a system configuration diagram of the imaging system 1. The imaging system 1 includes a swiveling surveillance camera 100, a wide-angle surveillance camera 200, and a client apparatus 300. The swiveling surveillance camera 100, wide-angle surveillance camera 200, and client apparatus 300 can communicate with one another via a network 400. The swiveling surveillance camera 100 can mechanically perform pan, tilt and zoom operations. The wide-angle surveillance camera 200 has a wide viewing angle and is capable of imaging in all directions: 360 degrees in a horizontal direction and 180 degrees in a vertical direction. The swiveling surveillance camera 100 and wide-angle surveillance camera 200 are installed, for example, on a ceiling in a room. Note that the swiveling surveillance camera 100 is an example of the zoom lens camera while the wide-angle surveillance camera 200 is an example of the wide-angle lens camera. Also, plural swiveling surveillance cameras 100 may be installed.

The client apparatus 300 as an image processing apparatus is a general-purpose computer such as a personal computer which can display the image captured by the swiveling surveillance camera 100 and wide-angle surveillance camera 200. The swiveling surveillance camera 100, wide-angle surveillance camera 200 and client apparatus 300 can communicate with one another through a wired connection of a private line, LAN cable or the like or through a wireless connection of a wireless LAN or the like. The network 400 is not particularly limited as long as the swiveling surveillance camera 100, wide-angle surveillance camera 200 and client apparatus 300 are allowed to communicate with one another.

Figure 1B:
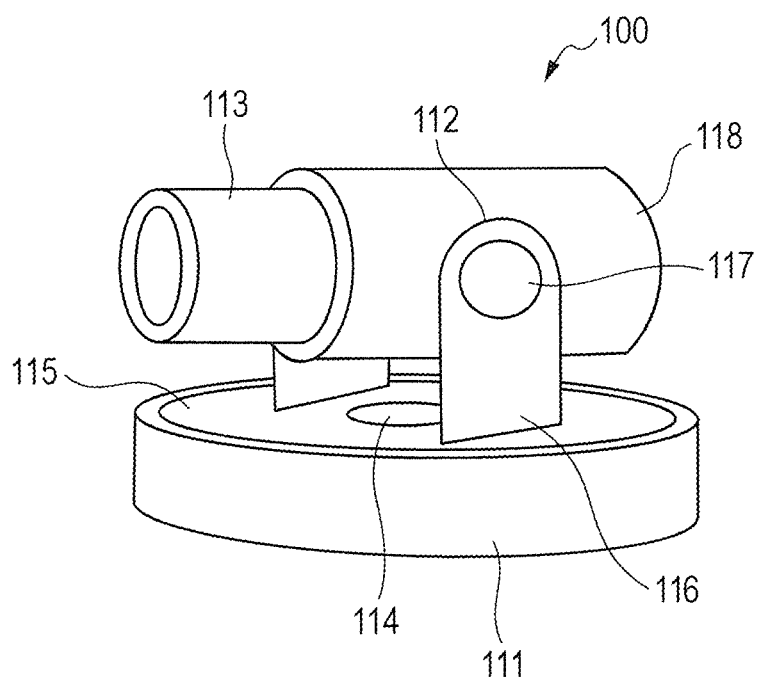

FIG. 1B is a schematic diagram of the swiveling surveillance camera 100 according to the present embodiment. The swiveling surveillance camera 100 includes a pan driving mechanism 111, a tilt driving mechanism 112 and a lens unit 113. The pan driving mechanism 111 includes a rotating shaft 114, a swivel base 115 and a pan driving unit 104. The swivel base 115 is installed rotatably around the rotating shaft 114. The pan driving mechanism 111 rotates the swivel base 115 around the rotating shaft 114 in a pan direction and changes an imaging direction as a viewing point of the swiveling surveillance camera 100 in the pan direction. The tilt driving mechanism 112 includes support plates 116, a support shaft 117 and a tilt driving unit 105. The support plates 116 are installed on opposite sides of the rotating shaft 114 on the swivel base 115, facing each other. The support shaft 117 is installed on the support plates 116 and supports a camera body 118 movably in a tilt direction. The tilt driving mechanism 112 changes the imaging direction of the swiveling surveillance camera 100 in the tilt direction. The lens unit 113 includes a zoom driving unit 106, a zoom lens and a focus lens and changes the angle of view of the swiveling surveillance camera 100. The lens unit 113 focuses on an object located at a predetermined position. Note that the zoom lens and focus lens are each made up of plural lenses and integrated into a single unit. Thus, the swiveling surveillance camera 100 can change the imaging direction in the pan and tilt directions.

Figure 2:
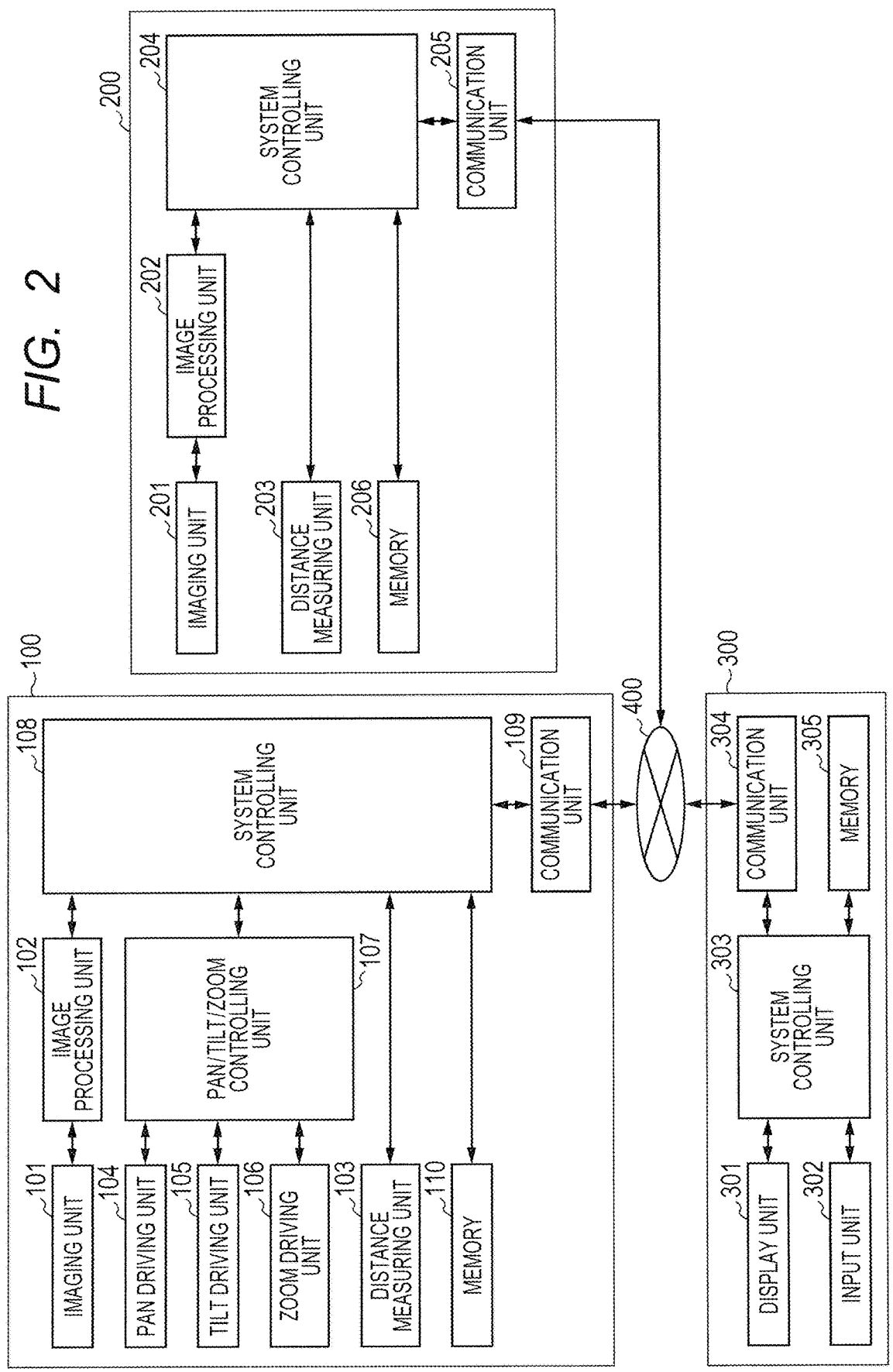
FIG. 2 is a block diagram showing a configuration of the imaging system according to the first embodiment of the present invention.

FIG. 2 is a block diagram of the imaging system 1 according to the present embodiment. The swiveling surveillance camera 100 includes an imaging unit 101, an image processing unit 102, a distance measuring unit 103, a pan driving unit 104, a tilt driving unit 105, a zoom driving unit 106, a pan, tilt and zoom controlling unit 107, a system controlling unit 108, a communications unit 109 and a memory 110. The imaging unit 101 includes a lens unit 113 and an imaging device such as a CMOS sensor, captures an image of an object, and converts the captured object image into an electrical signal through photoelectric conversion. The image processing unit 102 performs various types of image processing on the image signal resulting from the photoelectric conversion performed by the imaging unit 101, performs compression coding processing on the image signal subjected to the image processing, and thereby generates image data.

The distance measuring unit 103 as a measuring unit measures distance to the object using an autofocus function, an infrared sensor, or a light field or other technique which uses a light intensity distribution and information on light incident direction. When the autofocus function is used, the distance measuring unit 103 measures distance by searching for a distance at which the object is in focus using autofocus function. When the infrared sensor is used, the distance measuring unit 103 emits infrared light from an infrared light emitting element, detects position of reflected infrared light using a position sensor, and measures the distance to the object based on the detected position. A method which uses a light field will be described later. Note that according to the present embodiment, the swiveling surveillance camera 100 does not necessarily have to include the distance measuring unit 103.

The pan driving unit 104 includes a mechanical driving unit adapted to perform a pan operation as well as a motor, and when the motor operates, the pan driving mechanism 111 operates in the pan direction. The tilt driving unit 105 includes a mechanical driving unit adapted to perform a tilt operation as well as a motor, and when the motor operates, the tilt driving mechanism 112 operates in the tilt direction. The zoom driving unit 106 includes driving units for the focus lens and zoom lens as well as motors and when the motor operates, the zoom lens moves along an optical axis, changing a focal length. Also, when the motor operates, the focus lens moves along an optical axis, adjusting focus. The pan, tilt and zoom controlling unit 107 as a controlling unit controls the pan driving unit 104, tilt driving unit 105 and zoom driving unit 106 based on an instruction signal transmitted from the system controlling unit 108.

The system controlling unit 108 as a controlling unit is a CPU (Central Processing Unit), which performs processing based on a camera control signal transmitted via the communications unit 109. The system controlling unit 108 transmits a signal instructing the image processing unit 102 to adjust image quality. The system controlling unit 108 transmits a signal instructing the pan, tilt and zoom controlling unit 107 to perform a pan operation, tilt operation, zoom operation and focus control. Also, the system controlling unit 108 transmits a signal instructing the distance measuring unit 103 to measure the object distance. The communications unit 109 delivers generated image data to the client apparatus 300. The communications unit 109 receives camera control signals sent from the wide-angle surveillance camera 200 and client apparatus 300, and transmits the received signals to the system controlling unit 108. The communications unit 109 transmits responses to the camera control signals to the wide-angle surveillance camera 200 and client apparatus 300. The memory 110 includes ROM, RAM and the like and stores various control programs, various parameters and the like. The memory 110 stores, for example, a preset number used for camera control, a preset position corresponding to the preset number, a distance map, a distance from ceiling to ground in a room in which the swiveling surveillance camera 100 is installed, and the like. Note that the preset position stored in the memory 110 is received from the client apparatus 300.

The wide-angle surveillance camera 200 includes an imaging unit 201, an image processing unit 202, a distance measuring unit 203, a system controlling unit 204, a communications unit 205 and a memory 206. The imaging unit 201 includes a taking lens and an imaging device such as a CMOS sensor, captures an image of an object, and converts the captured object image into an electrical signal through photoelectric conversion. The imaging unit 201 includes a wide-angle lens having a hemispherical viewing angle. The image processing unit 202 performs various types of image processing on the image signal resulting from the photoelectric conversion performed by the imaging unit 201, performs compression coding processing on the image signal subjected to the image processing, and thereby generates image data. The distance measuring unit 203 as a measuring unit measures distance to the object using an autofocus function, an infrared sensor, or a light field or other technique, as with the distance measuring unit 103 of the swiveling surveillance camera 100. Note that according to the present embodiment, the wide-angle surveillance camera 200 may not include the distance measuring unit 203.

The system controlling unit 204 is a CPU, which performs processing based on a camera control signal transmitted via the communications unit 205. The system controlling unit 204 transmits a signal instructing the image processing unit 202 to adjust image quality. Also, the system controlling unit 204 transmits a signal instructing the distance measuring unit 203 to measure the object distance. The communications unit 205 delivers generated image data to the client apparatus 300. The communications unit 205 receives a camera control signal sent from the client apparatus 300, and transmits the received signal to the system controlling unit 204. The communications unit 205 transmits a response to the camera control signal to the client apparatus 300. The memory 206 includes ROM, RAM and the like and stores various control programs, various parameters and the like. The memory 206 stores, for example, a preset number used for camera control, a preset position corresponding to the preset number, a distance map, a default tilt position, a distance from ceiling to ground in a room in which the wide-angle surveillance camera 200 is installed, and the like. Note that the preset position stored in the memory 206 is received from the client apparatus 300. Also, the tilt position is an orientation of the swiveling surveillance camera 100 in the vertical direction, and may be represented, for example, by an angle or by other information.

The client apparatus 300 includes a display unit 301, an input unit 302, a system controlling unit 303, a communications unit 304 and a memory 305. The display unit 301 is a liquid crystal display device or the like and displays image data received from the swiveling surveillance camera 100 as well as image data received from the wide-angle surveillance camera 200. Also, the display unit 301 displays a graphic user interface (hereinafter referred to as GUI) used to perform camera control of the swiveling surveillance camera 100 and wide-angle surveillance camera 200. The camera control includes, for example, setting a zoom factor of the swiveling surveillance camera 100, registering a preset position, and imaging with the swiveling surveillance camera 100 and wide-angle surveillance camera 200. The input unit 302 as a designation unit includes a keyboard and a pointing device such as a mouse, and a user of the client apparatus 300 operates GUI via the input unit 302.

The system controlling unit 303 serving as an image acquiring unit, designation unit and position determining unit is a CPU, which generates camera control signals based on GUI operations by the user, and transmits the camera control signals to the swiveling surveillance camera 100 and wide-angle surveillance camera 200 via the communications unit 304. Also, the system controlling unit 303 displays image data received from the swiveling surveillance camera 100 and wide-angle surveillance camera 200 via the communications unit 304 on the display unit 301. The memory 305 includes ROM, RAM and the like and stores various control programs, various parameters and the like. The memory 305 stores a preset position, a default tilt position, a distance from ceiling to ground in the room in which the swiveling surveillance camera 100 and wide-angle surveillance camera 200 are installed, and the like. In this way, via the network 400, the client apparatus 300 acquires image data resulting from shooting with the swiveling surveillance camera 100 and wide-angle surveillance camera 200 and performs various types of camera control. The image data resulting from shooting with the wide-angle surveillance camera 200 is always delivered to the client apparatus 300 via the network 400, allowing the user such as surveillance staff to watch situations in all directions by means of images displayed on the client apparatus 300. Also, a predetermined position on the image captured by the wide-angle surveillance camera 200 can be enlarged by software processing, but an enlarged image depends on a resolution of the image. Therefore, even if a predetermined position on the image is enlarged, an image with a resolution desired by the user may not be available. In contrast, the swiveling surveillance camera 100, which captures an image by mechanically enlarging a predetermined position on an image captured by the wide-angle surveillance camera 200, can obtain an image with a higher resolution.

Figure 3:
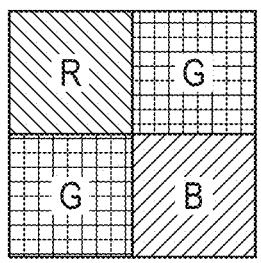
FIG. 3 is a schematic diagram of imaging pixels according to the first embodiment of the present invention.

A method for measuring a distance from a light field will be described with reference to FIGS. 3 to 5B. FIG. 3 is a schematic diagram of imaging pixels according to the present embodiment. In FIGS. 3 to 5B, although description will be given by taking the wide-angle surveillance camera 200 as an example, a similar configuration also applies to the swiveling surveillance camera 100. FIG. 3, which shows imaging pixels in a Bayer color array according to the present embodiment, is a plan view of 2-row by 2-column imaging pixels. In the Bayer color array, pixels having spectral sensitivity to G (green) are placed diagonally, and pixels having spectral sensitivity to R (red) and B (blue) are placed in remaining two locations.

Figure 4A:
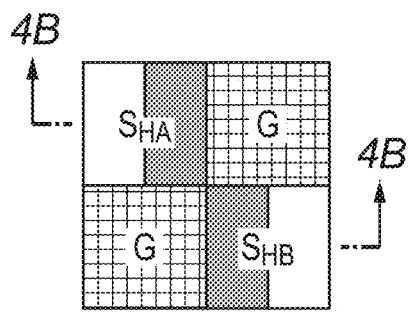
FIGS. 4A and 4B are schematic diagrams of focus detection pixels used for pupil division in a horizontal direction of a taking lens according to the first embodiment of the present invention.
Figure 4B:
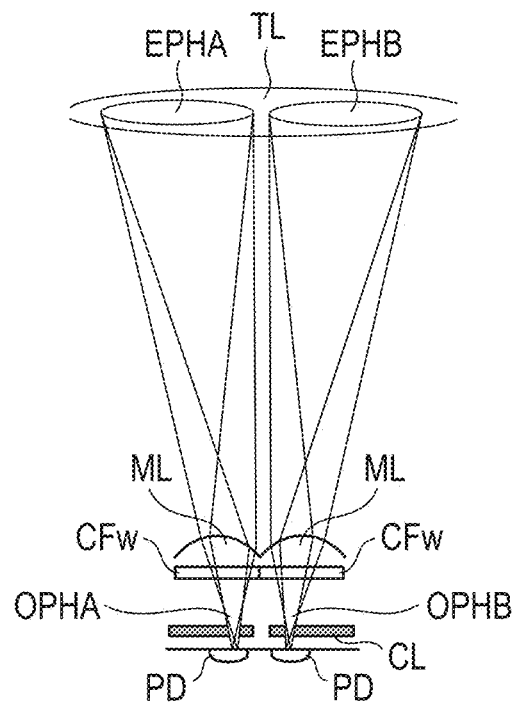

FIGS. 4A and 4B are schematic diagrams of focus detection pixels used for pupil division in a horizontal direction of a taking lens according to the present embodiment. FIG. 4A is a plan view of 2-row by 2-column pixels containing focus detection pixels. The G pixels are left as imaging pixels while the R pixel and B pixel are replaced by focus detection pixels SHA and SHB used for pupil division in the horizontal direction of the taking lens TL. FIG. 4B is a sectional view taken along line 4B-4B line in FIG. 4A. TL denotes the taking lens, ML denotes a microlens placed in the forefront of each pixel, PD schematically illustrates a photoelectric converter, and CL denotes a wiring layer in which signal wires used to transmit various signals are formed. Because signals of the focus detection pixels SHA and SHB are not used as signals of photographic images, a transparent film CFw is placed. Also, because an opening in the wiring layer CL is offset from a center line of the microlens ML in one direction and an opening OPHA in the focus detection pixel SHA is offset to the right side, a luminous flux passing through an exit pupil EPHA on the left side of the taking lens TL is received. Similarly, because an opening OPHB in the focus detection pixel SHB is offset to the right side, a luminous flux passing through an exit pupil EPHB on the right side of the taking lens TL is received. An object image detected by focus detection pixels SHA placed regularly in the horizontal direction is designated as image A. Also, an object image detected by focus detection pixels SHB placed regularly in the horizontal direction is designated as image B. In this case, an out-of-focus amount (amount of defocus) can be detected by detecting relative positions of image A and image B.

Figure 5A:
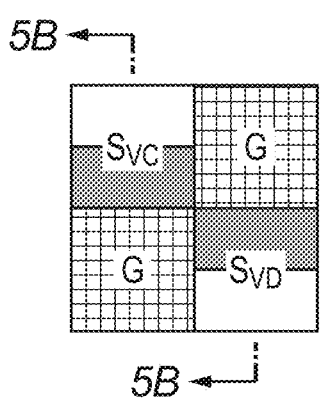
FIGS. 5A and 5B are schematic diagrams of focus detection pixels used for pupil division in a vertical direction of the taking lens according to the first embodiment of the present invention.
Figure 5B:
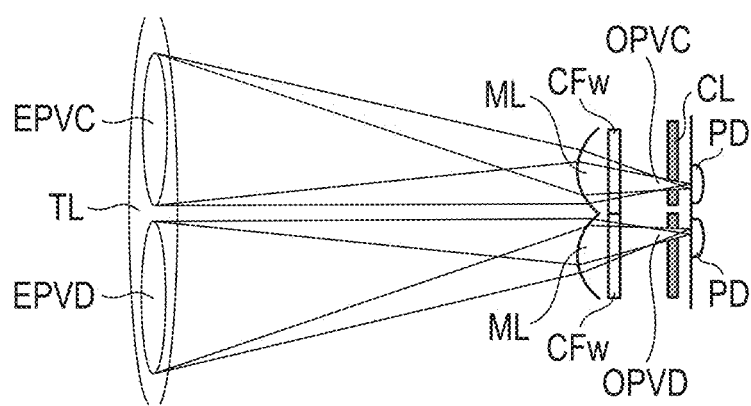

FIGS. 5A and 5B are schematic diagrams of focus detection pixels used for pupil division in a vertical direction of the taking lens TL according to the present embodiment. FIG. 5A is a plan view of 2-row by 2-column pixels containing focus detection pixels. As with FIG. 4A, the G pixels are left as imaging pixels while the R pixel and B pixel are replaced by focus detection pixels SVC and SVD used for pupil division in the vertical direction of the taking lens TL. FIG. 5B is a sectional view taken along line 5B-5B line in FIG. 5A. Because an opening OPVC in the focus detection pixel SVC is offset to a lower side, a luminous flux passing through an exit pupil EPVC on an upper side of the taking lens TL is received. Also, because an opening OPVD in the focus detection pixel SVD is offset to an upper side, a luminous flux passing through an exit pupil EPVD on a lower side of the taking lens TL is received. An object image acquired from focus detection pixels SVC placed regularly in the vertical direction is designated as image C. Also, an object image acquired from focus detection pixels SVD placed regularly in the vertical direction is designated as image D. In this case, an amount of defocus can be detected by detecting relative positions of image C and image D.

In this way, the imaging device of imaging unit 201 is configured such that 2-row by 2-column RGB pixels will be arranged repeatedly in a Bayer color array and that the focus detection pixels SHA, SHB, SVC and SVD will be scattered in the Bayer color array according to a predetermined rule and distributed in an entire area of the imaging device. The system controlling unit 204 calculates an out-of-focus amount based on a phase difference between two images generated by reading signals of focus detection pixels from each of all focus detection regions in which focus can be detected and converts the out-of-focus amount into an object distance by taking information on characteristics of the taking lens TL into consideration. By converting the out-of-focus amounts of all the regions into object distances, a distance map which brings positions of a display image into correspondence with the object distances can be obtained. The object distance is measured using the distance map.

Figure 6:
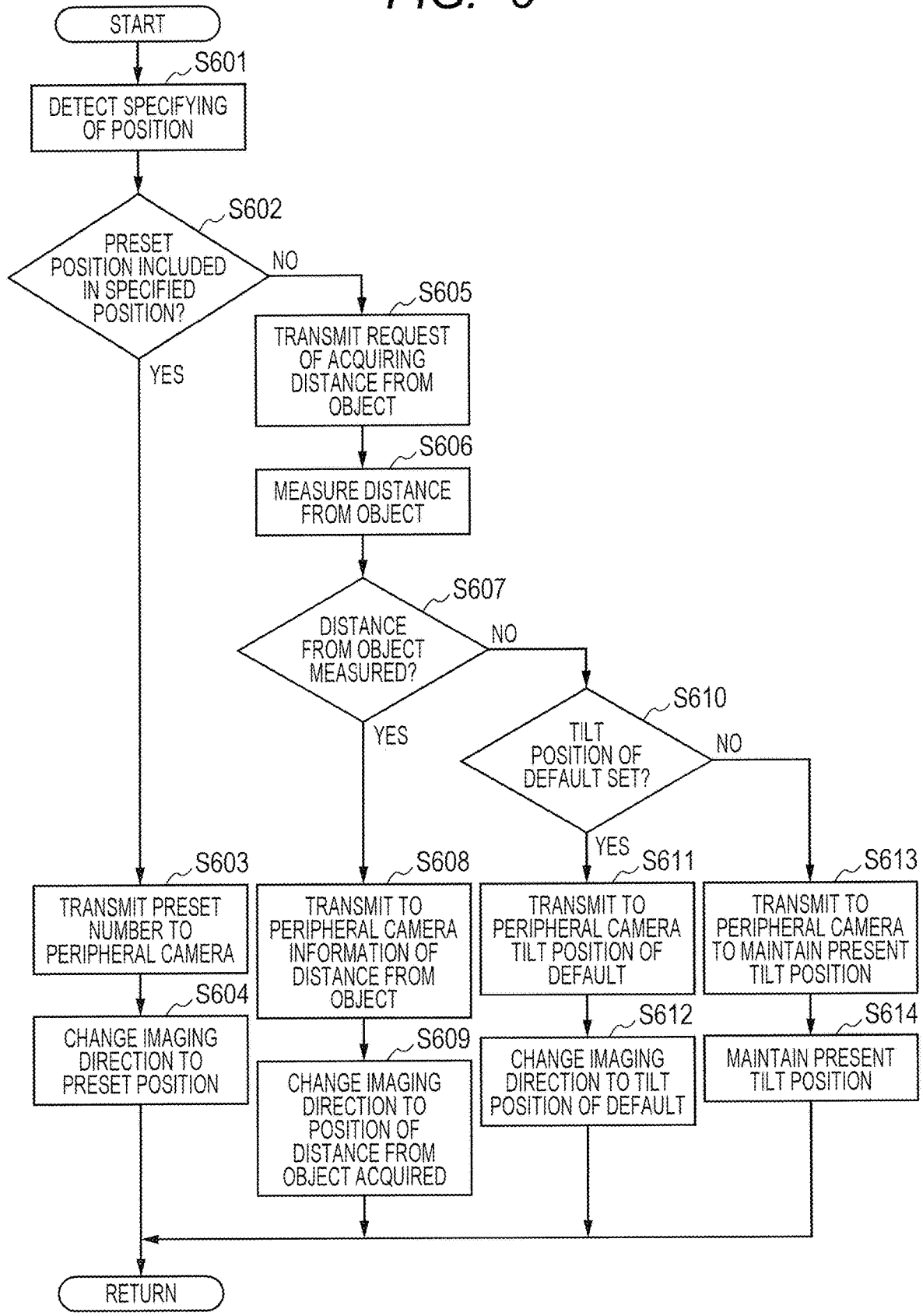
FIG. 6 is a flowchart showing processes of the imaging system according to the first embodiment of the present invention.

FIG. 6 is a flowchart showing processes of the imaging system according to the present embodiment. The present flowchart is started when the system controlling unit 303 executes a program stored in the memory 305 of the client apparatus 300. Processes of the wide-angle surveillance camera 200 are performed by executing a program stored in the memory 206 and processes of the swiveling surveillance camera 100 are performed by executing a program stored in the memory 110.

In step S601, the system controlling unit 303 of the client apparatus 300 detects that a predetermined position has been specified on an image displayed on the display unit 301. The image displayed on the display unit 301 has been captured by the wide-angle surveillance camera 200. On the image displayed on the display unit 301, the user specifies a desired position via the input unit 302 if the user wants to enlarge part of the image for some reasons such as when someone looking suspicious is spotted or something unusual is sensed. AS a method for specifying a position, the user may specify either a point or a rectangular region.

In step S602, the system controlling unit 303 determines whether or not the specified region including the specified position includes a preset position registered in the memory 305. It is assumed that the preset position as first position information has been registered together with a preset number in the swiveling surveillance camera 100 in advance. Information about an imaging position and depth in a two-dimensional plane for the swiveling surveillance camera 100, i.e., information about a distance has been set at the preset position registered in the memory 110 of the swiveling surveillance camera 100. That is, the preset position provides information about a position in an object space in the specified region. The registration of the preset position is done on the client apparatus 300 and the preset position is associated with coordinates in an image on the wide-angle surveillance camera 200. Consequently, the preset number possessed by the swiveling surveillance camera 100 can be brought into correspondence with the coordinates in the image on the wide-angle surveillance camera 200.

The preset position is, for example, a position the user wants to watch intensively and is position information with the highest priority among multiple pieces of position information in the object space of the image. When the specified position is a point, the specified region is a region covering a predetermined area around the specified position. The region covering a predetermined area is, for example, a region having a predetermined radius from the specified position. The predetermined area may be set by the user in advance or may be a default value. When the specified position is a rectangular region, the rectangular region becomes the specified region. When the position specified by the user indicates a point, the system controlling unit 303 determines whether or not the specified region includes a preset position. When the position specified by the user is a rectangular region, the system controlling unit 303 determines whether or not the rectangular region, which is a specified region, includes a position in a two-dimensional plane of the preset position. Hereinafter, the position specified by the user and the specified region will be described as specified position information.

When the specified region includes a preset position (step S602: Yes), the system controlling unit 303 transmits a preset number to the swiveling surveillance camera 100 (step S603). In step S603, the system controlling unit 303 transmits the preset number to the swiveling surveillance camera 100 installed around the wide-angle surveillance camera 200. In step S604, the pan, tilt and zoom controlling unit 107 changes the imaging direction to the preset position corresponding to the received preset number. Specifically, the pan driving unit 104 and tilt driving unit 105 are controlled such that the imaging direction of the swiveling surveillance camera 100 will be changed.

On the other hand, when the specified region does not include the preset position (step S602: No), the specified position information does not include information about the depth, and thus the system controlling unit 303 transmits a request to measure the object distance, to the wide-angle surveillance camera 200 (step S605). In step S605, the system controlling unit 303 transmits the request to measure the object distance, to the wide-angle surveillance camera 200 together with the specified position information. In step S606, using the distance measuring unit 203, the system controlling unit 204 of the wide-angle surveillance camera 200 measures the object distance in a direction of the position specified by the user. The distance measuring unit 203 measures the object distance using the autofocus function, an infrared sensor, a light field or the like.

In measuring the object distance, if autofocus or infrared light is used, only a distance to a single point can be measured. Consequently, when the user specifies a region, the object distance may be changed greatly depending on the position at which the object distance is measured. If the measured object distance is not the distance at the position intended by the user, pan and tilt positions may be displaced greatly. On the other hand, when the object distance is measured using a light field, the distance to the object included in the region specified by the user can be acquired from each of all pixels of the imaging device. If the distance acquired from all the pixels are added and averaged by the number of pixels and the resulting average distance is used as the object distance, the displacement from the position intended by the user can be reduced. Also, distances may be averaged by weighting central part of the region specified by the user. The use of weighting allows the object distance of the object located at the position intended by the user to be measured more closely.

In step S607, the system controlling unit 204 determines whether or not the object distance has been measured successfully. If the object distance has been measured successfully (step S607: Yes), the system controlling unit 204 transmits position information including the object distance, to the neighboring swiveling surveillance camera 100 (step S608). The position information as second position information including the specified position information and object distance is ranked next to the preset position in priority. Note that in step S608, the transmission of the position information to the swiveling surveillance camera 100 may be performed from the wide-angle surveillance camera 200 or performed by the client apparatus 300 by collecting position information. Since the swiveling surveillance camera 100 and wide-angle surveillance camera 200 are installed at different positions, the swiveling surveillance camera 100 and wide-angle surveillance camera 200 have different position information. Therefore, it is necessary to convert the position information of the wide-angle surveillance camera 200 into position information of the swiveling surveillance camera 100. The process of converting the position information may be performed from any of the swiveling surveillance camera 100, wide-angle surveillance camera 200, and client apparatus 300.

Figure 7A:
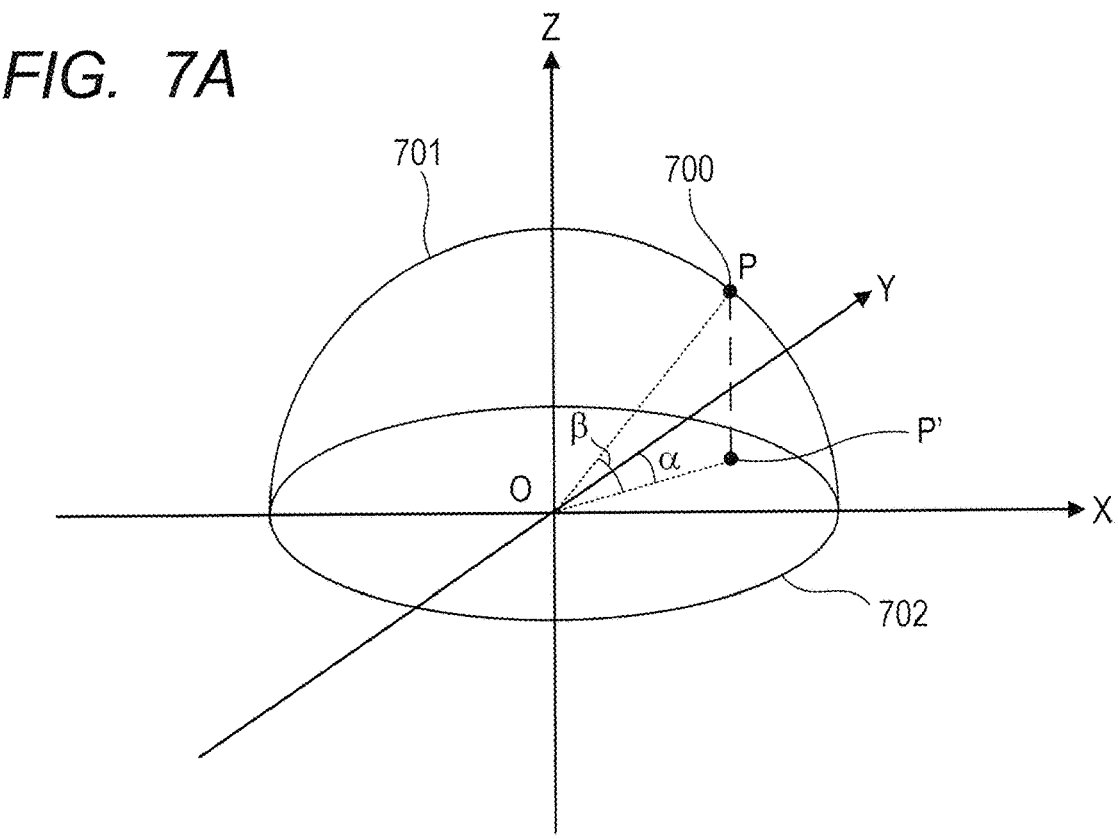
FIGS. 7A and 7B are diagrams describing an image captured by a wide-angle surveillance camera according to the first embodiment of the present invention.
Figure 7B:
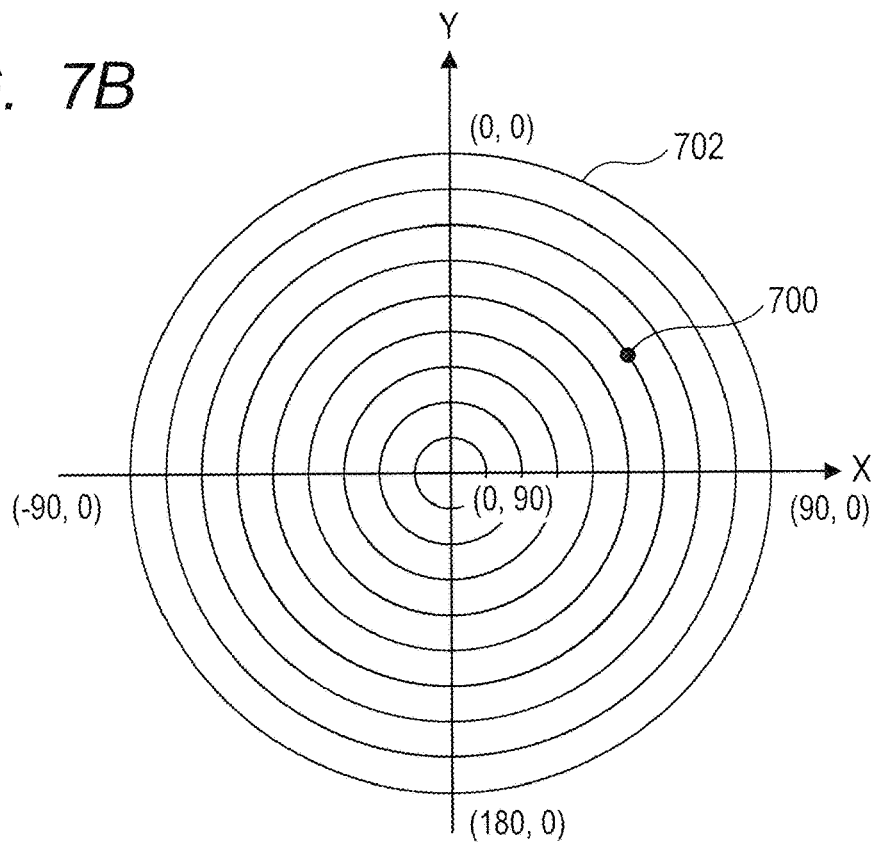

A position information conversion process will be described with reference to FIGS. 7A and 7B and FIGS. 8A and 8B. FIGS. 7A and 7B are diagrams describing an image captured by the wide-angle surveillance camera 200 according to the present embodiment. FIG. 7A is a diagram showing a planar image captured by the wide-angle surveillance camera 200 and FIG. 7B is an explanation diagram of the planar image. In FIG. 7A, the vertical direction of the wide-angle surveillance camera 200 is taken as a Z-axis. Individual circles shown in FIG. 7B divide a hemispherical image 701 at 10-degree intervals in the vertical direction. The hemispherical image 701 taken by the wide-angle surveillance camera 200 is displayed as a planar image 702 on the client apparatus 300. In the present embodiment, since the wide-angle surveillance camera 200 is installed on a room ceiling, a center position O of the planar image 702 corresponds to a position right under the wide-angle surveillance camera 200. Consequently, angles in the horizontal and vertical directions at the center of the planar image 702 are 0 degrees and 90 degrees, respectively. When an object 700 is located at a position P on the hemispherical image 701, on the planar image 702, the object 700 is displayed at a position P' inclined at an angle α in the horizontal direction and at an angle β in the vertical direction. Thus, the angles α and β can be calculated using the planar image 702.

Figure 8A:
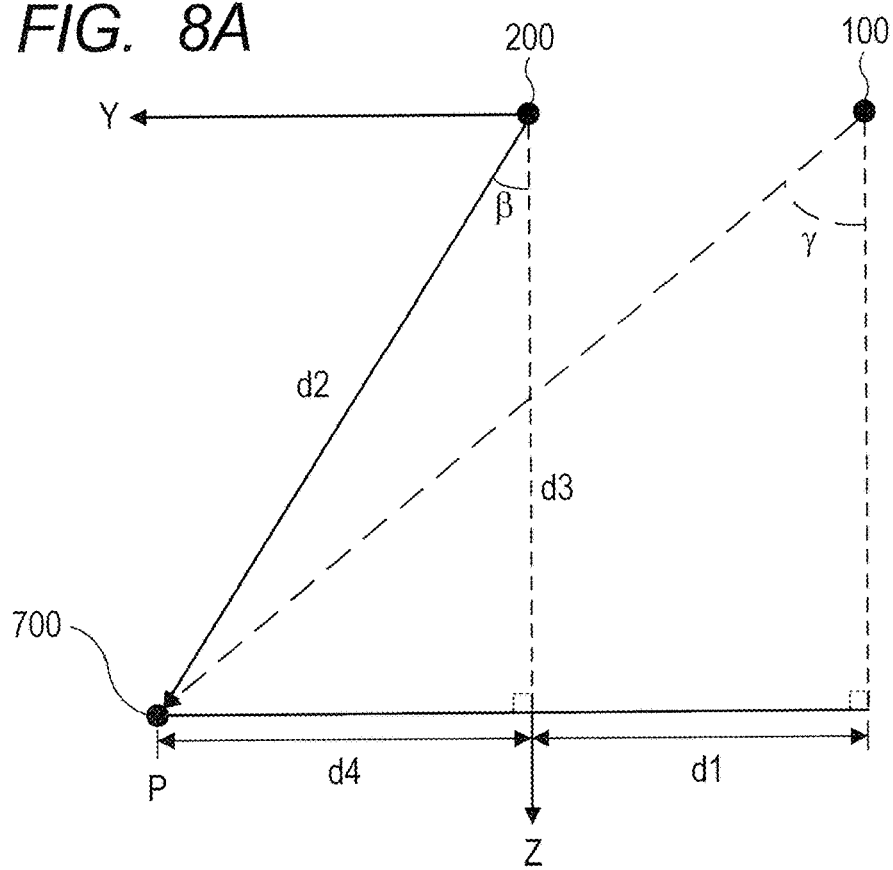
FIGS. 8A and 8B are schematic diagrams describing a position information conversion process according to the first embodiment of the present invention.
Figure 8B:
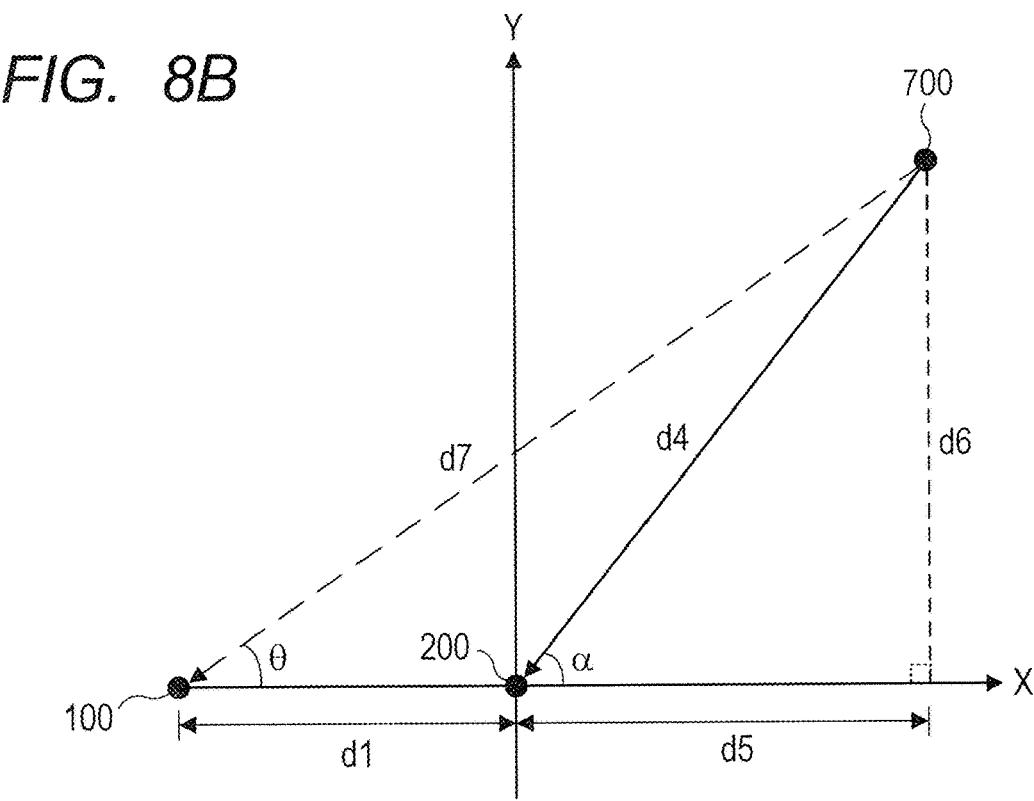

FIGS. 8A and 8B are schematic diagrams describing the position information conversion process according to the present embodiment. FIG. 8A is a diagram showing a method for calculating an angle in the vertical direction and FIG. 8B is a diagram showing a method for calculating an angle in the horizontal direction. The method for calculating an angle in the vertical direction will be described with reference to FIG. 8A. A distance between the swiveling surveillance camera 100 and wide-angle surveillance camera 200 in the horizontal direction (X-Y direction) will be designated as d1 and distance to the object 700 measured by the wide-angle surveillance camera 200 will be designated as a distance d2. The angle β between the wide-angle surveillance camera 200 and object 700 is measured using the planar image 702. A distance d3 from the wide-angle surveillance camera 200 to the object 700 in a perpendicular direction, a distance d4 between the wide-angle surveillance camera 200 and object 700 in the horizontal direction, and an angle γ between the swiveling surveillance camera 100 and object 700 in the vertical direction Z are calculated using expressions 1 to 3 below.

$$d3 = d2 \cdot \cos \beta \quad \text{(expression 1)}$$

$$d4 = d2 \cdot \sin \beta \quad \text{(expression 2)}$$

$$\gamma = \tan^{-1}(d1+d4)/d3 \quad \text{(expression 3)}$$

Next, the method for calculating an angle in the horizontal direction will be described with reference to FIG. 8B. The distance between the wide-angle surveillance camera 200 and object 700 in the horizontal direction is the distance d4 calculated using expression 2 while an angle α between the wide-angle surveillance camera 200 and object 700 is calculated using the planar image 702. A horizontal distance d5 between the wide-angle surveillance camera 200 and object 700, a vertical distance d6 between the wide-angle surveillance camera 200 and object 700, and an angle θ between the swiveling surveillance camera 100 and object 700 in the horizontal direction are calculated using expressions 4 to 6 below.

$$d5 = d4 \cdot \cos \alpha \quad \text{(expression 4)}$$

$$d6 = d4 \cdot \sin \alpha \quad \text{(expression 5)}$$

$$\theta = \tan^{-1} d6/(d1+d5) \quad \text{(expression 6)}$$

Consequently, the position information of the wide-angle surveillance camera 200 can be converted into the position information of the swiveling surveillance camera 100. Note that a distance d7 between the swiveling surveillance camera 100 and object 700 may be calculated from expression 7 using values calculated from expressions 1 to 6 and that focusing may be done using the distance d7.

$$d7 = d6/\sin \theta \quad \text{(expression 7)}$$

In step S609, the system controlling unit 108 of the swiveling surveillance camera 100 changes the imaging direction to the imaging position determined from acquired position information. Specifically, the system controlling unit 108 generates an instruction signal based on the specified position information and object distance, and transmits the instruction signal to the pan, tilt and zoom controlling unit 107. The pan, tilt and zoom controlling unit 107 controls the pan driving unit 104 and tilt driving unit 105 such that the imaging direction of the swiveling surveillance camera 100 will move to the position specified by the instruction signal i.e., in the direction indicated by the horizontal angle θ and vertical angle γ calculated using expressions 3 and 6. Consequently, even if the preset position is not included in the specified region, the imaging direction of the swiveling surveillance camera 100 can be changed to the position intended by the user using the distance information acquired based on the specified position information.

On the other hand, if the object distance cannot be measured (step S607: No), the system controlling unit 204 determines whether or not a default tilt position has been set (step S610). The case where the object distance cannot be measured includes a case in which measurement of the object distance fails or a case in which the wide-angle surveillance camera 200 is not equipped with a distance measuring unit 203. If a default tilt position has been set (step S610: Yes), the system controlling unit 204 transmits information about the default tilt position (step S611). In step S611, the system controlling unit 204, transmits position information as third position information including the specified position information and the default tilt position to the neighboring swiveling surveillance camera 100. The position information including the specified position information and the default tilt position is ranked next to the position information including the object distance in priority. In step S612, the system controlling unit 108 receives the specified position information and position information on the default tilt position, generates an instruction signal, and transmits the instruction signal to the pan, tilt and zoom controlling unit 107. The pan, tilt and zoom controlling unit 107 controls the pan driving unit 104 and tilt driving unit 105 such that the imaging direction will be changed to the position specified by the user and the default tilt position. Consequently, since the imaging direction is changed to the default tilt position when the object distance cannot be measured, the imaging direction of the swiveling surveillance camera 100 can be changed, whenever possible, to the position intended by the user. Note that the process of converting the position information including the specified position information and the default tilt position into position information for the swiveling surveillance camera 100 may be performed from any of the swiveling surveillance camera 100, wide-angle surveillance camera 200, and client apparatus 300.

On the other hand, if no default tilt position has been set (step S610: No), the system controlling unit 204 transmits information that the current tilt position will be maintained, to the neighboring swiveling surveillance camera 100 (step S613). In step S613, the system controlling unit 204 transmits position information as fourth position information including the position information specified for the swiveling surveillance camera 100 and the current tilt position to the neighboring swiveling surveillance camera 100. The information including the specified position information and the current tilt position is a position candidate ranked next to the position information including the specified position information and the default tilt position in priority. In step S614, the system controlling unit 108 receives the specified position information as well as the information that the current tilt position will be maintained, generates an instruction signal based on the specified position information and the current tilt position, and transmits the instruction signal to the pan, tilt and zoom controlling unit 107. The pan, tilt and zoom controlling unit 107 controls the pan driving unit 104 and tilt driving unit 105 so as to move the imaging direction to the specified position while maintaining the tilt position of the swiveling surveillance camera 100. Consequently, even if no default tilt position has been set, since the imaging direction can be changed to the position corresponding to the specified position information while maintaining the current tilt position, the imaging direction can be changed, whenever possible, to the position intended by the user. Note that the process of converting the position information specified by the user and the current tilt position into position information for the swiveling surveillance camera 100 may be performed from the swiveling surveillance camera 100. Also, the process of converting the position information may be performed from the wide-angle surveillance camera 200 or client apparatus 300 by transmitting the tilt position of the swiveling surveillance camera 100. Also, if the object distance cannot be measured in step S607, the system controlling unit 204 may transmit information that the object distance has not been measured successfully to the client apparatus 300. When the system controlling unit 204 transmits information that the object distance has not been measured successfully to the client apparatus 300, the processes of steps S610 to S611 and step S613 may be performed from the client apparatus 300. Also, the order of determination processes (steps S602, S607 and S610) may be changed according to user settings.

In this way, according to the present embodiment, one of plural pieces of position information in the object space of an image captured by the wide-angle surveillance camera 200 is established as an imaging position in priority order. Consequently, since the imaging direction of the swiveling surveillance camera 100 is changed to the imaging position determined in the priority order of the plural pieces of position information, the imaging direction of the swiveling surveillance camera 100 can be changed to the position intended by the user.

Second Embodiment

Next, an imaging system 1 according to a second embodiment of the present invention will be described. In the imaging system 1 according to the present embodiment, the swiveling surveillance camera 100 is moved to a fixed tilt position. Components similar to those of the first embodiment are denoted by the same reference numerals as the corresponding components, and description thereof will be omitted.

Figure 9:
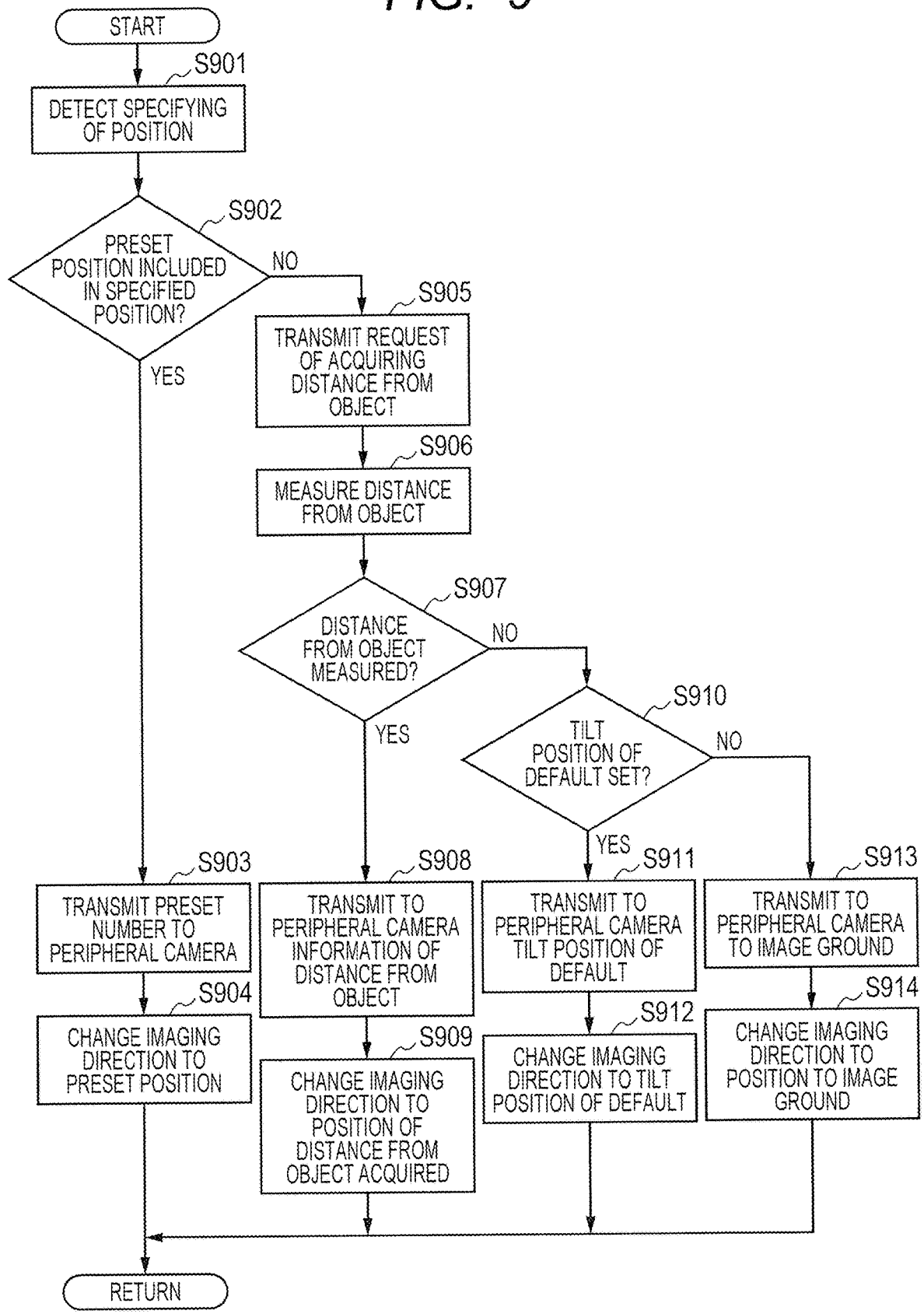
FIG. 9 is a flowchart showing processes of an imaging system according to a second embodiment of the present invention.

FIG. 9 is a flowchart showing processes of the imaging system according to the present embodiment. Note that steps S901 to S912 are the same as steps S601 to S612. In step S901, the system controlling unit 303 of the client apparatus 300 detects that a predetermined position has been specified on an image captured by the wide-angle surveillance camera 200, the image being displayed on the display unit 301. In step S902, the system controlling unit 303 determines whether or not the specified region includes a preset position. When the specified region includes a preset position (step S902: Yes), the system controlling unit 303 transmits a preset number to the swiveling surveillance camera 100 (step S903). In step S904, the pan, tilt and zoom controlling unit 107 controls the pan driving unit 104 and tilt driving unit 105 such that the imaging direction will be changed to the preset position corresponding to the received preset number. On the other hand, when the specified region does not include the preset position (step S902: No), the system controlling unit 303 transmits a request to measure the object distance, to the wide-angle surveillance camera 200 together with position information specified by the user (step S905). In step S906, using the distance measuring unit 203, the system controlling unit 204 of the wide-angle surveillance camera 200 measures the object distance in the direction of the specified position information. In step S907, the system controlling unit 204 determines whether or not the object distance has been measured successfully. If the object distance has been measured successfully (step S907: Yes), the system controlling unit 204 transmits position information, i.e., an exposure station including the object distance, to the neighboring swiveling surveillance camera 100 (step S908). In step S909, the system controlling unit 108 of the swiveling surveillance camera 100 generates an instruction signal based on the position information specified by the user as well as on the object distance and transmits the instruction signal to the pan, tilt and zoom controlling unit 107. On the other hand, if the object distance cannot be measured (step S907: No), the system controlling unit 204 determines whether or not a default tilt position has been set (step S910). If a default tilt position has been set (step S910: Yes), the system controlling unit 204 transmits the specified position information and the default tilt position to the swiveling surveillance camera 100 (step S911). In step S912, the system controlling unit 108 generates an instruction signal and transmits the instruction signal to the pan, tilt and zoom controlling unit 107. Based on the instruction signal, the pan, tilt and zoom controlling unit 107 controls the pan driving unit 104 and tilt driving unit 105 such that the imaging direction will be changed to the default tilt position.

If no default tilt position has been set (step S910: No), the system controlling unit 204 transmits a tilt position showing the ground (step S913). In step S913, the system controlling unit 204 transmits the specified position information as well as information on the tilt position showing the ground to the swiveling surveillance camera 100. The tilt position showing the ground can be calculated by setting the distance from ceiling to ground beforehand at the time of installation of the swiveling surveillance camera 100 and wide-angle surveillance camera 200. Specifically, if the distance from ceiling to ground is designated as a distance d2, the tilt position showing the ground can be calculated from expressions 1 to 6 using the horizontal angle θ and vertical angle β calculated based on specified position information. Alternatively, the distance to the ground may be measured beforehand by the distance measuring unit 203 of the wide-angle surveillance camera 200 and the distance measuring unit 103 of the swiveling surveillance camera 100. Specifically, if the measured distance to the ground is designated as the distance d2, the tilt position showing the ground can be calculated from expressions 1 to 6 using the horizontal angle θ and vertical angle β.

In step S914, the system controlling unit 108 of the swiveling surveillance camera 100 changes the imaging direction to the position showing the ground. Specifically, the system controlling unit 108 receives the specified position information and position information on the tilt position showing the ground, generates an instruction signal, and transmits the instruction signal to the pan, tilt and zoom controlling unit 107. The pan, tilt and zoom controlling unit 107 controls the pan driving unit 104 and tilt driving unit 105 so as to change the imaging direction of the swiveling surveillance camera 100 to the specified position information and the position showing the ground. Note that the process of converting the specified position information and the tilt position showing the ground into position information for the swiveling surveillance camera 100 may be performed from any of the swiveling surveillance camera 100, wide-angle surveillance camera 200, and client apparatus 300. Also, the process of step S913 may be performed from the client apparatus 300. Also, whereas the process of changing the imaging direction of the swiveling surveillance camera 100 to the position showing the ground has been described in the present embodiment, the imaging direction of the swiveling surveillance camera 100 can be changed to a tilt position for taking shots at any height from the ground according to a desired object of interest. For example, if the desired object of interest is a human being, the imaging direction may be moved to a tilt position at a height of 1.5 m from the ground.

In this way, according to the present embodiment, when no default tilt position has been set, the imaging direction of the swiveling surveillance camera 100 is controlled so as to move to a predetermined tilt position. Consequently, since the imaging direction of the swiveling surveillance camera 100 is changed to a predetermined tilt position even when the tilt position of a desired object of interest changes before and after movement of the swiveling surveillance camera 100, the imaging direction can be changed, whenever possible, to the position intended by the user.

Third Embodiment

Next, a third embodiment of the present invention will be described. In the imaging system 1 according to the present embodiment, only the swiveling surveillance camera 100 is equipped with a distance measuring unit 203. Components similar to those of the first embodiment are denoted by the same reference numerals as the corresponding components, and description thereof will be omitted.

Figure 10:
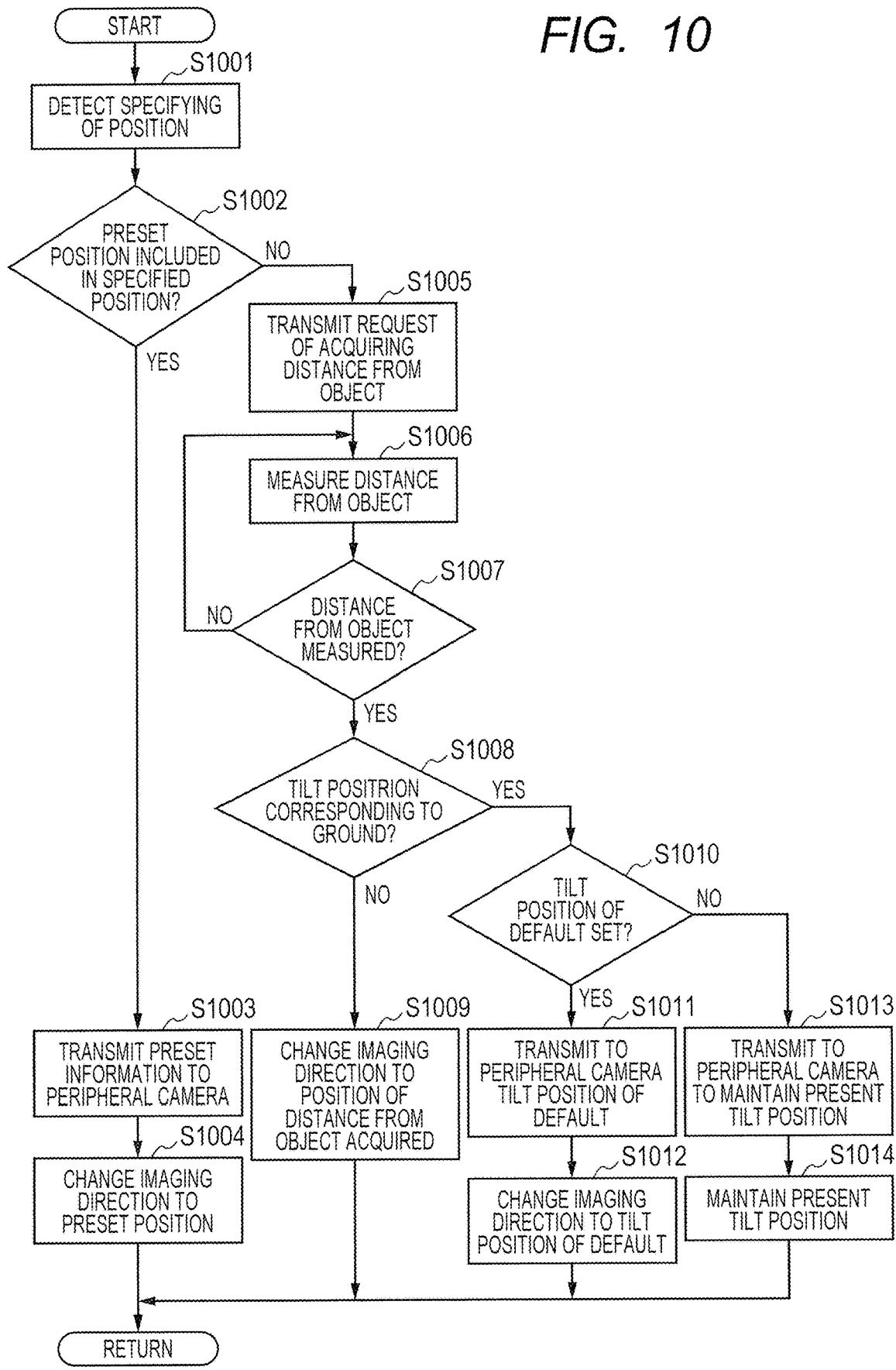
FIG. 10 is a flowchart showing processes of an imaging system according to a third embodiment of the present invention.

FIG. 10 is a flowchart showing processes of the imaging system 1 according to the present embodiment. Note that steps S1001 to S1004 and S1010 to S1014 are the same as steps S601 to S604 and S610 to S614. In step S1001, the system controlling unit 303 of the client apparatus 300 detects that a predetermined position has been specified on an image captured by the wide-angle surveillance camera 200, the image being displayed on the display unit 301. In step S1002, the system controlling unit 303 determines whether or not the specified region includes a preset position registered in the memory 305. If the specified region includes a registered preset position (S1002: Yes), the system controlling unit 303 transmits a preset number to the swiveling surveillance camera 100 (step S1003). In step S1004, based on the preset position corresponding to the received preset number, pan, tilt and zoom controlling unit 107 controls the pan driving unit 104 and tilt driving unit 105 such that the imaging direction will be changed to the preset position.

On the other hand, when the specified region does not include the preset position (step S1002: No), the system controlling unit 303 transmits a request to measure the object distance, to the swiveling surveillance camera 100 (step S1005). Since the specified position information is intended for the wide-angle surveillance camera 200, it is necessary to convert the specified position information into position information for the swiveling surveillance camera 100. The process of converting the position information may be performed from either the swiveling surveillance camera 100 or client apparatus 300.

Figure 11:
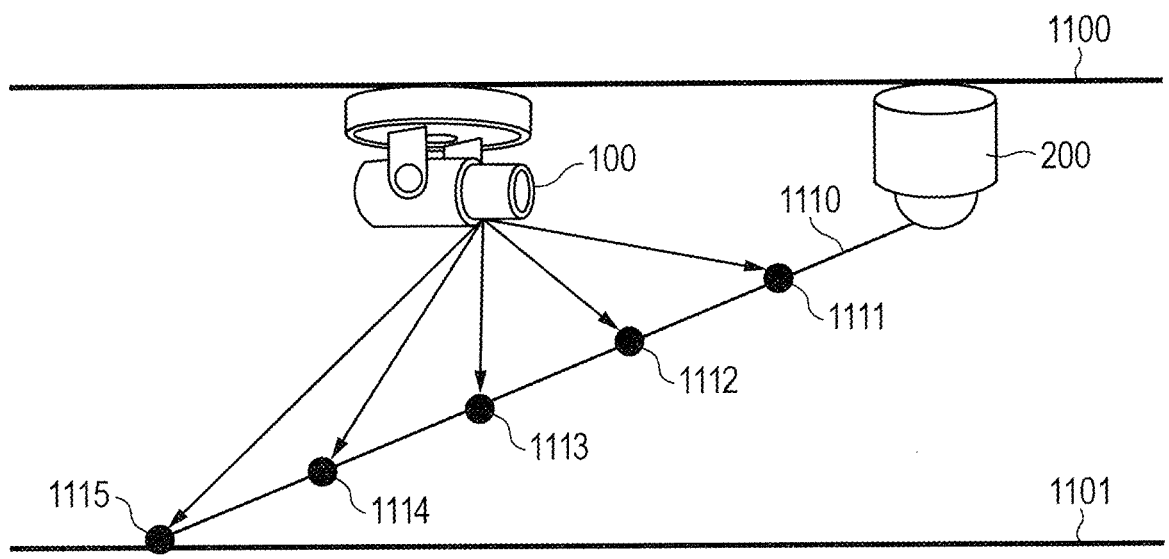
FIG. 11 is a diagram showing an installation example of a wide-angle surveillance camera and a swiveling surveillance camera according to the third embodiment of the present invention.

In step S1006, based on the received position information, the system controlling unit 108 of the swiveling surveillance camera 100 makes the distance measuring unit 103 measure the object distance at fixed intervals towards the ground from the position showing the wide-angle surveillance camera 200. A method for measuring the object distance will be described with reference to FIG. 11. FIG. 11 is a diagram showing an installation example of the wide-angle surveillance camera 200 and swiveling surveillance camera 100 according to the present embodiment. The swiveling surveillance camera 100 and wide-angle surveillance camera 200 are installed on a ceiling 1100, and the ground 1101 is located right under the swiveling surveillance camera 100 and wide-angle surveillance camera 200. On a line 1110 which represents a direction of positions specified by the user as viewed from the wide-angle surveillance camera 200, positions 1111 to 1115 correspond to positions at which imaging is done by the swiveling surveillance camera 100. Also, the position 1115 corresponds to the position of the ground 1101. Since the position specified by the user does not include depth information, it is not clear where on the line 1110 the swiveling surveillance camera 100 should be directed. According to the present embodiment, the system controlling unit 108 of the swiveling surveillance camera 100 makes the distance measuring unit 103 measure the object distance at fixed intervals along the line 1110 from the position showing the wide-angle surveillance camera 200. First, the system controlling unit 108 makes the distance measuring unit 103 measure the object distance in a direction of the position 1111. If the object distance cannot be measured at the position 1111, or if the measured object is not within a predetermined range from the line 1110, the object distance in a direction of the next position 1112 is measured. In this way, the system controlling unit 108 measures the object distance at fixed intervals along the line 1110 until the object distance is measured successfully.

In step S1007, the system controlling unit 108 determines whether or not the object distance has been measured successfully. If the object distance has been measured successfully (step S1007: Yes) the system controlling unit 108 determines whether or not the tilt position of the object corresponds to the ground (S1008). If the object distance cannot be measured (step S1007: No), the system controlling unit 108 measures the object distance at a next position on the line 1110. In S1008, the system controlling unit 108 calculates the tilt position from the object distance, determines whether or not the tilt position of the object, of which the distance is measured corresponds to the ground. In FIG. 11, when the tilt position of the object corresponds to the position 1115, the system controlling unit 108 determines that the tilt position of the object corresponds to the ground. When the tilt position of the object does not correspond to the ground, the system controlling unit 108 changes the imaging direction to the position at the measured object distance (S1009). In step S1009, the system controlling unit 108 calculates the pan position and tilt position based on the measured object distance and specified position information, generates an instruction signal and transmits the instruction signal to the pan, tilt and zoom controlling unit 107. Based on the instruction signal, the pan, tilt and zoom controlling unit 107 controls the pan driving unit 104 and tilt driving unit 105 such that the imaging direction will be changed to the pan position and tilt position. The pan position is a horizontal position of the swiveling surveillance camera 100, and may be represented by an angle or other information.

On the other hand, when the tilt position of the object corresponds to the ground (step S1008: Yes), the system controlling unit 204 of the wide-angle surveillance camera 200 determines whether or not a default tilt position has been set (step S1010). In step S1010, the system controlling unit 108 transmits a signal to the wide-angle surveillance camera 200 and the system controlling unit 204 of the wide-angle surveillance camera 200 determines whether or not a default tilt position has been set. Note that the system controlling unit 108 may be designed to transmit a signal to the client apparatus 300, letting the client apparatus 300 perform the processes of step S1010 and subsequent steps. If a default tilt position has been set (step S1010: Yes), the system controlling unit 204 transmits the specified position information and the default tilt position to the swiveling surveillance camera 100 (step S1011). In step S1012, the system controlling unit 108 generates an instruction signal and transmits the instruction signal to the pan, tilt and zoom controlling unit 107. The pan, tilt and zoom controlling unit 107 controls the pan driving unit 104 and tilt driving unit 105 such that the imaging direction will be changed to be directed to the specified position information and the default tilt position.

On the other hand, if no default tilt position has been set (step S1010: No), the system controlling unit 204 transmits the position information specified for the swiveling surveillance camera 100 as well as the information that the current tilt position will be maintained, to the swiveling surveillance camera 100 (step S1013). In step S1014, the system controlling unit 108 generates an instruction signal and transmits the instruction signal to the pan, tilt and zoom controlling unit 107. The pan, tilt and zoom controlling unit 107 controls the pan driving unit 104 and tilt driving unit 105 so as to change the imaging direction while maintaining the current tilt position of the swiveling surveillance camera 100.

In this way, according to the present embodiment, when the distance measuring unit 103 of the swiveling surveillance camera 100 is used, the object distance can be measured at predetermined intervals in the direction of the position specified by the user and the swiveling surveillance camera 100 can be directed at the object existing in the direction of the specified position. Consequently, the imaging direction of the swiveling surveillance camera 100 can be changed to the position intended by the user.

OTHER EMBODIMENTS

Whereas the present invention has been described in detail with reference to exemplary embodiments, the present invention is not limited to the specific embodiments described above and various other embodiments are included in the present invention without departing from the spirit and scope of the invention. For example, a plurality of the swiveling surveillance camera 100 may be provided. Also, the wide-angle surveillance camera 200 does not necessarily have to be wide-angled, and may be a swiveling surveillance camera 100 or the like.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-082146, filed Apr. 15, 2016, which is hereby incorporated by reference herein in its entirety.

What is claimed is:

1. An imaging system comprising:
   one or more processors; and
   at least one memory coupled to the one or more processors, the at least one memory having instructions stored thereon which, when executed by the one or more processors, cause the imaging system to:
      acquire a first image captured by a first imaging apparatus;
      determine position information used for changing an imaging direction of a second imaging apparatus, when a given region is specified in the first image;
      determine the imaging direction of the second imaging apparatus based on the determined position information; and
      change the imaging direction of the second imaging apparatus based on the determined imaging; direction,
   wherein determining the position information includes:
      when a preset position for the second imaging apparatus is included in the given region, determining position information of the preset position as the position information used for changing the imaging direction of the second imaging apparatus, and
      when the preset position is not included in the given region and a distance to an object in the given region is acquired by measuring, determining position information based on the distance as the position information used for changing the imaging direction of the second imaging apparatus.

2. The imaging system according to claim 1, wherein the instructions, when executed by the one or more processors, further cause the imaging system to calculate an average of distances acquired from respective pixels belonging to an imaging device of the first imaging apparatus.

3. The imaging system according to claim 2, wherein the instructions, when executed by the one or more processors, further cause the imaging system to weigh the distance to the object located at central part of the region.

4. The imaging system according to claim 1, wherein the instructions, when executed by the one or more processors, further cause the imaging system to further:
   specify a tilt position of the second imaging apparatus; and
   wherein determining the position information includes, when the distance to the object is not acquired, determine the imaging direction using the given region and position information based on the tilt position.

5. The imaging system according to claim 4, wherein in determining the position information, the instructions, when executed by the one or more processors, cause the imaging system to, when the position information based on the tilt position is not acquired, determine position information based on a current tilt position of the second imaging apparatus, as the position information used for changing the imaging direction of the second imaging apparatus.

6. An image processing apparatus configured to be able to communicate with a first imaging apparatus and a second imaging apparatus, of which a viewing point is able to be changed, the image processing apparatus comprising:
   one or more first processors; and
   at least one first memory coupled to the one or more first processors, the at least one first memory having instructions stored thereon which, when executed by the one or more first processors, cause the image processing apparatus to:
      acquire a first image captured by the first imaging apparatus; and
      determine position information used for changing an imaging direction of a second imaging apparatus, when a given region is specified in the first image;
      determine the imaging direction of the second imaging apparatus based on the determined position information, and
      change the imaging direction of the second imaging apparatus based on the determined imaging direction,
   wherein the first imaging apparatus or the second imaging apparatus comprises:
      one or more second processors; and
      at least one second memory coupled to the one or more second processors, the at least one second memory having instructions stored thereon which, when executed by the one or more second processors, cause the first imaging apparatus or the second imaging apparatus to:
         when a preset position for the second imaging apparatus is included in the given region, determine position information of the preset position as the position information used for changing the imaging direction of the second imaging apparatus, and
         when the preset position is not included in the given region and a distance to an object in the given region is acquired by measuring, determine position information based on the distance as the position information used for changing the imaging direction of the second imaging apparatus.

7. A control method for an imaging system, the method comprising:
   acquiring a first image captured by a first imaging apparatus;

determining position information used for changing an imaging direction of a second imaging apparatus, when a given region is specified in the first image;

determining the imaging direction of the second imaging apparatus based on the determined position information; and changing the imaging direction of the second imaging apparatus based on the determined imaging direction, wherein determining the position information includes:
   when a preset position for the second imaging apparatus is included in the given region, determining position information of the preset position as the position information used for changing the imaging direction of the second imaging apparatus, and
   when the preset position is not included in the given region and a distance to an object in the given region is acquired by measuring, determining position information based on the distance as the position information used for changing the imaging direction of the second imaging apparatus.

8. A control method for an image processing apparatus configured to be able to communicate with a first imaging apparatus and a second imaging apparatus, of which a viewing point is able to be changed, the method comprising:

acquiring a first image captured by the first imaging apparatus;

determining position information used for changing an imaging direction of a second imaging apparatus, when a given region is specified in the first image;

determining the imaging direction of the second imaging apparatus based on the determined position information; and changing the imaging direction of the second imaging apparatus based on the determined imaging direction, wherein determining the position information includes:
   when a preset position for the second imaging apparatus is included in the given region, determining position information of the preset position as the position information used for changing the imaging direction of the second imaging apparatus, and
   when the preset position is not included in the given region and a distance to an object in the given region is acquired by measuring, determining position information based on the distance as the position information used for changing the imaging direction of the second imaging apparatus.

9. A non-transitory computer-readable recording medium storing a readable program for operating a computer which can communicate with a first imaging apparatus and a second imaging apparatus, of which a viewing point is able to be changed, the readable program causing the computer to perform a method comprising:

acquiring a first image captured by the first imaging apparatus;

determining position information used for changing an imaging direction of a second imaging apparatus, when a given region is specified in the first image;

determining the imaging direction of the second imaging apparatus based on the determined position information; and changing the imaging direction of the second imaging apparatus based on the determined imaging direction, wherein determining the position information includes:
   when a preset position for the second imaging apparatus is included in the given region, determining position information of the preset position as the position information used for changing the imaging direction of the second imaging apparatus, and
   when the preset position is not included in the given region and a distance to an object in the given region is acquired by measuring, determining position information based on the distance as the position information used for changing the imaging direction of the second imaging apparatus.

\* \* \* \* \*